United States Patent
Stottlemyer et al.

(10) Patent No.: US 9,293,238 B1
(45) Date of Patent: Mar. 22, 2016

(54) ACOUSTIC-SENSING UNDERWATER TOW CABLE

(71) Applicants: Thomas R. Stottlemyer, Noank, CT (US); Gene W. Wills, Ashaway, RI (US); Douglas P. Hembdt, Tiverton, RI (US); Erin M. Baumann, Washington, DC (US)

(72) Inventors: Thomas R. Stottlemyer, Noank, CT (US); Gene W. Wills, Ashaway, RI (US); Douglas P. Hembdt, Tiverton, RI (US); Erin M. Baumann, Washington, DC (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 296 days.

(21) Appl. No.: 14/041,259

(22) Filed: Sep. 30, 2013

(51) Int. Cl.
*H01B 7/04* (2006.01)

(52) U.S. Cl.
CPC ....................................... *H01B 7/045* (2013.01)

(58) Field of Classification Search
CPC ........................................................ H01B 7/045
USPC .................... 367/153; 977/742, 842; 204/450
See application file for complete search history.

(56) References Cited

U.S. PATENT DOCUMENTS

| | | | | |
|---|---|---|---|---|
| 6,683,819 B1 * | 1/2004 | Estaphan | ............... | G01V 1/201 367/106 |
| 7,120,087 B2 * | 10/2006 | Lee | ......... | G01V 1/201 367/20 |
| 8,760,973 B1 * | 6/2014 | Chamblee | ............. | G01V 1/201 367/173 |
| 8,958,994 B2 * | 2/2015 | Padilla | .................. | G01N 29/07 702/34 |
| 2010/0203328 A1 * | 8/2010 | Hochstetter | ............ | B82Y 30/00 428/368 |
| 2012/0176858 A1 * | 7/2012 | Stenzel | ................. | G01V 1/201 367/20 |
| 2012/0176859 A1 * | 7/2012 | Pabon | .................... | G01V 1/201 367/20 |
| 2013/0168542 A1 * | 7/2013 | Navarro-Sorroche | ... | H05H 3/06 250/256 |

OTHER PUBLICATIONS

Um, Keehong, and Dong-Soo Lee. "Designing two-dimensional film speakers using piezoelectric materials." Consumer Electronics-Berlin (ICCE-Berlin), 2011 IEEE International Conference on. IEEE, 2011.*
Stottlemeyer, Thomas. Acoustic-Sensing Underwater Tow Cable. U.S. Appl. No. 14/041,259. Naval Undersea Warfare Center DIV Newport RI Technology Partnership Enterprise Office, 2013.*

* cited by examiner

*Primary Examiner* — James Hulka
*Assistant Examiner* — Jonathan Armstrong
(74) *Attorney, Agent, or Firm* — James M. Kasischke; Michael P. Stanley

(57) ABSTRACT

An acoustic-sensing underwater tow cable includes a cable core for transmission of power/signals there along, a first jacket encasing the cable core, and discrete regions of carbon nanotubes affixed to the first jacket. The carbon nanotubes at each of the discrete regions define an acoustic sensor. A second jacket encases each acoustic sensor and any electrical conductors coupled thereto.

1 Claim, 2 Drawing Sheets

ACOUSTIC-SENSING UNDERWATER TOW CABLE

STATEMENT OF GOVERNMENT INTEREST

The invention described herein may be manufactured and used by or for the Government of the United States of America for governmental purposes without the payment of any royalties thereon or therefor.

CROSS REFERENCE TO OTHER PATENT APPLICATIONS

None.

BACKGROUND OF THE INVENTION (1) Field of the Invention

The present invention relates generally to underwater tow cables, and more particularly to a cable that includes a cable core for transmission of power and data signals, a first jacket encasing the cable core, and discrete regions of carbon nanotubes (CNT) layers affixed to the first jacket and covered by a second jacket. The layers of carbon nanotubes at each of the discrete regions define an acoustic sensor. The positioning of the layers of carbon nanotubes provides specific acoustic information about the water column between the towing vessel and the towed sensor system as well as at other locations in the vicinity of the towed sensor system.

(2) Description of the Prior Art

Underwater surveillance is frequently performed using acoustic arrays/systems that are towed through the water. In general, these systems comprise a towing vessel, an electro-optical mechanical tow cable coupled on one end to the towing vessel, and a towed sensor system coupled to the other end of the tow cable. The towed sensor system includes an array of hydrophones designed to sense a variety of underwater acoustic signals based on a particular surveillance mission.

The sensor system is deployed at a generally horizontal orientation at some underwater depth as the tow cable traverses the distance/depth between the towing vessel and the towed sensor system. The tow cable provides the mechanical strength needed to tow the sensor system; the electricity required to power the sensor system; and for data signal transfer between the sensor system and the towing vessel. However, this type of acoustic surveillance system provides a limited amount of acoustic information about the water column between the towing vessel and the towed sensor system.

SUMMARY OF THE INVENTION

Accordingly, it is a general purpose and primary object of the present invention to provide an acoustic-sensing underwater tow cable with the ability to provide detailed acoustic information about the water column between a towing vessel and a towed sensor system as well as at other locations in the vicinity of the towed sensor system.

Other objects and advantages of the present invention will become more obvious hereinafter in the specification and drawings.

In accordance with the present invention, an acoustic-sensing underwater tow cable includes a cable core for transmission of power and data signals there along, a first jacket encasing the cable core, and discrete regions/layers of carbon nanotubes affixed to the first jacket. The CNT layers at each of the discrete regions define an acoustic sensor. At least one electrical conductor is coupled to each acoustic sensor. A second jacket encases each acoustic sensor and the electrical conductors.

BRIEF DESCRIPTION OF THE DRAWINGS

Other objects, features and advantages of the present invention will become apparent upon reference to the following description of the preferred embodiments and to the drawings, wherein corresponding reference characters indicate corresponding parts throughout the several views of the drawings and wherein.

DETAILED DESCRIPTION OF THE INVENTION

Figure 1:
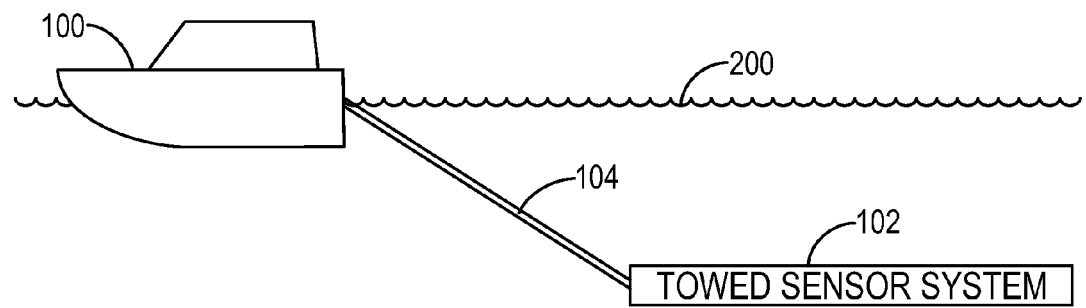
FIG. 1 is a prior art schematic view of a towed sensor system being towed by a vessel.

Prior to describing the acoustic-sensing underwater tow cable of the present invention; reference is made to FIG. 1 in which a surface-deployed vessel 100 tows a sensor array 102 in a horizontal orientation at some depth under the water surface 200. As is known in the art, the sensor array 102 can be a hosed towed array or may be a rigid body equipped with wings, fairings, etc., (not shown) that maintain the proper towed body orientation during towing.

The sensor array 102 is mechanically and electrically (and/or optically) coupled to the towing vessel 100 via an electro-optical and mechanical tow cable 104. The tow cable 104 includes strength members and data-carrying conductors/fibers as well as electrical power transmission wires.

Figure 2:
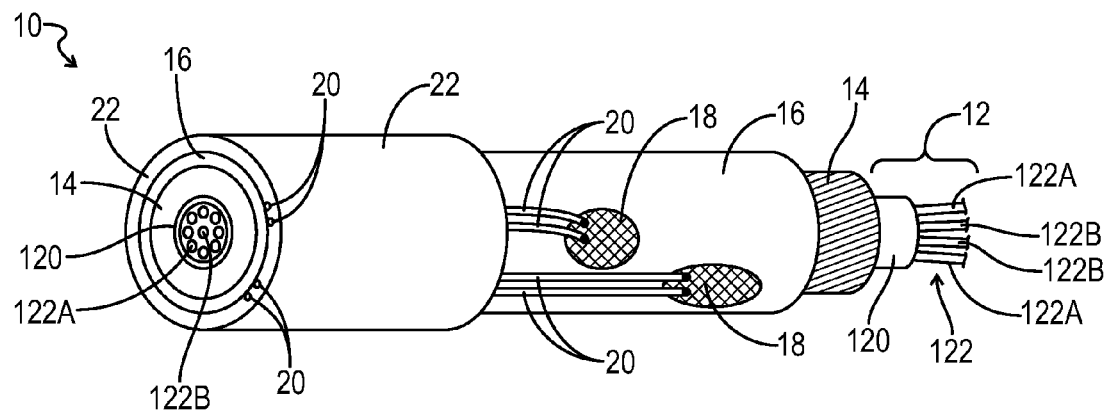
FIG. 2 is a cutaway view of an acoustic-sensing underwater tow cable in accordance with an embodiment of the present invention.

Referring now to FIG. 2, an embodiment of an acoustic-sensing underwater tow cable construction in accordance with the present invention is shown and is referenced by numeral 10. The tow cable 10 could be used to replace the above-described tow cable 104. The tow cable 10 is illustrated in a cut-away view in order to illustrate the various portions thereof.

The central portion of the tow cable 10 is a cable core 12 that can include an outer jacket 120 disposed about a number of power and signal transmission lines 122. Typically, the power and signal transmission lines 122 include one or more electrical conductors 122A and one or more optical fibers 122B. In addition to providing power, the transmission lines 122 support signal transfer between a towing vessel and a towed sensor system that would be coupled to either end of the tow cable 10. The particular design of the cable core 12 is not a limitation of the present invention.

While the outer jacket 120 may provide sufficient mechanical strength for some (non-towing) applications, armor wires 14 are provided about the jacket. The particular type of the armor wires 14, configuration, and size, are not limitations of the present invention. By way of non-limiting examples, the armor wires 14 include metal wires made from materials such as galvanized plow steel or synthetic fibers made from commercially-available materials such as KEVLAR or SPECTRA fibers.

Encasing the cable core 12 and armor wires 14 is a jacket 16 that extends along the length of the tow cable 10. The jacket 16 is generally extruded in place. The jacket 16 is made from a flexible waterproof material such as polyurethane, nylon, or high-density polyethylene. The jacket 16 serves as the substrate for a number of relatively inexpensive acoustic sensors as will be explained further below.

In accordance with the present invention, acoustic sensors are defined on the jacket 16 by regions 18 of carbon nanotube (CNT) layers such as single-walled and multi-walled CNTs. In particular, research has shown that thin-film acoustic transducers may be built by using single-walled carbon nanotubes (SWNTs) that are thin, transparent, lightweight, durable and have an exceptional acoustic response.

More specifically, the regions 18 of CNTs are affixed to the jacket 16. Each region 18 is a thin layer of CNTs that can be sprayed or rolled on masked-off regions of the jacket 16, or affixed to the jacket via film transfer techniques. The well-known electrical properties of CNTs allow each region 18 to function as an acoustic sensor or hydrophone. The size/shape of the region 18 can be used to tune the region for sensitivity to specific acoustic frequencies.

For example, sensitivity to lower frequencies could be achieved by increasing the size/length of the region 18 along the tow cable 10. Each region 18 of CNTs has one or more electrical conductors 20 coupled thereto with conductors extending back along the length of the cable 10 to the end thereof that is to be coupled to a towing vessel. The number of conductors 20 may be optimized by using electrical signal techniques such as multiplexing.

Encasing the regions 18, the conductors 20, as well as exposed portions of the jacket 16, is another waterproof jacket 22. The jacket 22 can be similar to the jacket 16 in that it can be extruded in place and can be made from polyurethane, nylon, or high-density polyethylene.

The advantages of the present invention are numerous. Since a conventional underwater tow cable typically includes a cable core 12, armor wires 14 and a jacket 16; the conventional underwater tow cable can be readily modified to incorporate a number of CNT-region acoustic sensors. In this way, an underwater tow cable can provide acoustic information within the water column between a towing vessel and a towed sensor system as well as other locations in the vicinity of the sensor system.

Figure 3:
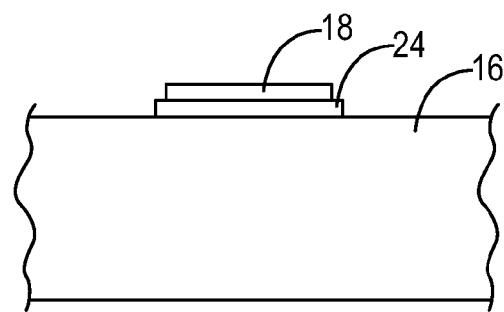
FIG. 3 is a side view of a carbon nanotube acoustic sensor region backed with acoustic isolation material in accordance with an embodiment of the present invention.

Although the present invention has been described relative to a particular embodiment thereof, the scope of the present invention is not so limited. For example, as shown in FIG. 3, each region 18 of CNTs could be disposed on a layer of acoustic isolation material 24. The goal of the isolation material 24 is to isolate the region 18 from mechanical vibrations emanating from the cable core 12 and the armor wires 14. The isolation material 24 can be an acoustic isolation material (e.g., rubber, nylon, or polyurethane) that is applied prior to affixing the regions 18 or simultaneously with the regions.

Figure 4:
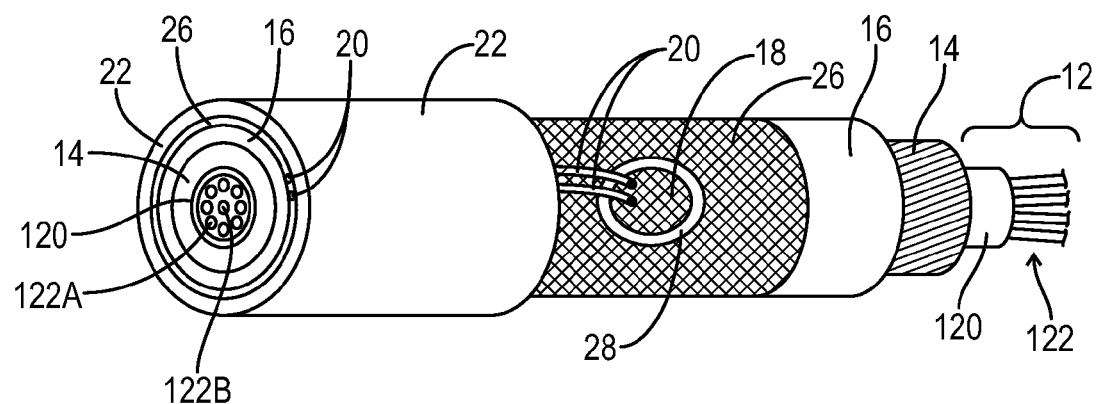
FIG. 4 is a cutaway view of an acoustic-sensing underwater tow cable construction in accordance with another embodiment of the present invention.

FIG. 4 illustrates another embodiment of the present invention where a layer 26 of CNTs are affixed to the jacket 16 along the length thereof in such a way that the discrete regions 18 are still defined while the layer 26 covers the remainder of the outer surface of jacket. That is, a CNT-free gap 28 surrounds each CNT region 18. Each gap 28 can be defined by masking the jacket 16 prior to the affixing of CNTs thereto. As a result, the regions 18 still function as acoustic sensors while the remaining contiguous CNT layer 26 provides additional mechanical strength for the core of the tow cable 10.

It will be understood that many additional changes in the details, materials, steps and arrangement of parts, which have been herein described and illustrated in order to explain the nature of the invention, may be made by those skilled in the art within the principle and scope of the invention as expressed in the appended claims.

What is claimed is:
1. An acoustic-sensing tow cable comprising:
a cable core having a plurality of power and signal transmission lines encased by an outer jacket;
armor wires longitudinally and helically encasing said outer jacket, said armor wires selected from a group consisting of metal wires and synthetic fibers;
a first jacket having an inner surface encasing said armor wires with said first jacket extending along a length of said tow cable wherein said first jacket is selected from the group consisting of polyurethane, nylon, and polyethylene;
a first layer, said first layer comprising contiguous carbon nanotubes partially encasing said first jacket with an effect of said first layer strengthening said first jacket;
discrete regions containing a plurality of carbon nanotubes with each of said discrete regions positioned on sections of said first jacket not encased by said first layer, wherein said carbon nanotubes at each of said discrete regions define an acoustic sensor with a size and shape of each of said discrete regions configured to tuning of a specified acoustic frequency;
at least one electrical conductor coupled to each said acoustic sensor with said at least one electrical conductor positioned on said first layer and having an end capable of coupling to a tow vessel;
acoustic isolation material disposed between each said acoustic sensor and said first jacket wherein a planar area of said isolation material at each said acoustic sensor exceeds a planar area of each said acoustic sensor; and
a second jacket encasing said acoustic sensors, said at least one electrical conductor, said acoustic isolation material and said first layer wherein said second jacket is selected from the group consisting of polyurethane, nylon, and polyethylene;
wherein said tow cable is capable of acoustic detection thru a water column of said tow cable when said tow cable is being towed.

* * * * *